(12) United States Patent
Meyer

(10) Patent No.: US 9,680,643 B2
(45) Date of Patent: Jun. 13, 2017

(54) SYSTEM AND METHOD FOR THE SECURE TRANSMISSION OF DATA

(75) Inventor: Bernd Meyer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 46 days.

(21) Appl. No.: 14/239,596

(22) PCT Filed: Aug. 1, 2012

(86) PCT No.: PCT/EP2012/065010
§ 371 (c)(1),
(2), (4) Date: Feb. 19, 2014

(87) PCT Pub. No.: WO2013/026663
PCT Pub. Date: Feb. 28, 2013

(65) Prior Publication Data
US 2014/0189374 A1    Jul. 3, 2014

(30) Foreign Application Priority Data
Aug. 23, 2011   (DE) .................... 10 2011 081 421

(51) Int. Cl.
*H04L 29/06*    (2006.01)
*H04L 9/08*    (2006.01)
*H04L 9/32*    (2006.01)

(52) U.S. Cl.
CPC .......... *H04L 9/0866* (2013.01); *H04L 9/3278* (2013.01)

(58) Field of Classification Search
CPC .... H04L 9/0866; H04L 9/3271; H04L 9/3278
(Continued)

(56) References Cited

U.S. PATENT DOCUMENTS 4,694,412 A  *  9/1987  Domenik ................ G06F 7/584
                                                           380/46
7,653,197 B2    1/2010  Van Dijk
(Continued)

FOREIGN PATENT DOCUMENTS

| CN | 1875565 | 12/2006 |
|---|---|---|
| CN | 101681657 | 3/2010 |
| WO | WO 2006/067739 | 6/2006 |

OTHER PUBLICATIONS

Suh E. et al; "Physical Unclonable Functions for Device Authentification and Secret Key Generation"; 2007 44th ACM/IEEE Design Automation Conference: San Diego, Ca, Jun. 4-8, 2007, IEEE, Piscataway, NJ; pp. 9-14; ISBN: 978-1-59593-627-1; XP031183294; 2007; US; Jun. 1, 2007.

(Continued)

*Primary Examiner* — Sarah Su
(74) *Attorney, Agent, or Firm* — Cozen O'Connor

(57) ABSTRACT

A system for securely transmitting data includes a control device and at least one security module. The control device is configured for producing a cryptographic key using a physically unclonable function (PUF). The at least one security module is configured for communicating with the control device at least one of confidentially and authentically using the cryptographic key. The control device has no storage for storing the cryptographic key. The control device includes at least one hardware device that is configured for providing a specific feature combination. The control device also includes a calculation unit that is configured for producing the cryptographic key using the specific feature combination and the physically unclonable function (PUF). The control device further includes a program-controlled device that is configured for executing a first computer program product, which is configured for performing the (Continued)

encrypted/authenticated communication with the security module via a first and second communication interfaces.

15 Claims, 2 Drawing Sheets

(58) Field of Classification Search
USPC .................................. 713/194, 168; 380/44
See application file for complete search history.

(56) References Cited

U.S. PATENT DOCUMENTS

| | | | |
|---|---|---|---|
| 8,601,279 B2* | 12/2013 | Little et al. .................... 713/183 |
| 2005/0005157 A1* | 1/2005 | Folmsbee ........... G06F 9/30145 |
| | | | 726/3 |
| 2006/0271793 A1 | 11/2006 | Devadas |
| 2008/0044027 A1 | 2/2008 | Van Dijk |
| 2009/0083833 A1 | 3/2009 | Ziola et al. |
| 2010/0199103 A1 | 8/2010 | Van Rijnswou |
| 2010/0322418 A1* | 12/2010 | Potkonjak .................... 380/255 |
| 2011/0002461 A1* | 1/2011 | Erhart et al. .................... 380/44 |
| 2011/0087300 A1* | 4/2011 | Van Den |
| | | Eerenbeemd ......... A61B 5/063 |
| | | | 607/2 |
| 2011/0163088 A1* | 7/2011 | Besling ................ H04L 9/3278 |
| | | | 219/660 |
| 2011/0261961 A1* | 10/2011 | Dharmaraju et al. ........ 380/277 |
| 2012/0137119 A1* | 5/2012 | Doerr .................... G06F 15/167 |
| | | | 713/100 |
| 2012/0137137 A1* | 5/2012 | Brickell et al. ............... 713/182 |
| 2013/0142329 A1* | 6/2013 | Bell et al. ........................ 380/44 |
| 2013/0298211 A1* | 11/2013 | M'Raihi et al. ................... 726/7 |
| 2014/0013123 A1* | 1/2014 | Khazan et al. ............... 713/189 |
| 2015/0046718 A1* | 2/2015 | Meyer .......................... 713/189 |
| 2016/0359627 A1* | 12/2016 | Lewis .................... H04L 9/0866 |

OTHER PUBLICATIONS

International Search Report dated Oct. 24, 2012.
DE Office Action dated May 29, 2012.

* cited by examiner

SYSTEM AND METHOD FOR THE SECURE TRANSMISSION OF DATA

CROSS-REFERENCE TO RELATED APPLICATIONS

This is a U.S. national stage of PCT Application No. PCT/EP2012/065010, filed on 1 Aug. 2012, which claims priority to German Patent Application No. 10 2011 081 421.3, filed on 23 Aug. 2011, each of which is hereby incorporated in its entirety by reference.

FIELD OF THE INVENTION

The present invention relates to a system for securely transmitting data and to a method for securely transmitting data.

DESCRIPTION OF THE RELATED ART

In electronic systems that feature protected transmission of data, security modules are used today that perform the encryption and/or authentication of data. To this end, these security modules are coupled to a control device of the electronic system via a protected data link and interchange data with the control device, for example in encrypted form, so that a potential attacker cannot tap off the data in plain text within the electronic system before said data are cryptographically edited by the security module. If the data communication between the control unit and the security module is not encrypted, an attacker could simultaneously read the data by simply eavesdropping on the data communication between the control device and the security module. Similar conclusions apply with regard to the integrity of the data communication between the control device and the security module.

If an existing electronic system, for example a control system for an automation installation, that has no security module is intended to be extended by such a security module, for example when the hardware is revised, the problem frequently arises that the control devices that have been used in the electronic system prior to the revision of the hardware do not have a secure non-volatile memory that can be used to store a secret key. If revision of the hardware now involves a security module being provided in such an electronic system, a new communication interface is produced between the control device of the electronic system and the security module. Since a cryptographic key cannot be stored securely in the control device, encrypted communication between the control device and the security module cannot be performed without difficulty. The control device can communicate with the security module only in unencrypted form. This makes it easier for an attacker to eavesdrop on this communication, however.

A flash memory that could permanently store a cryptographic key is complex to manufacture and cannot be miniaturized to the same extent as other semiconductor structures, such as transistors. Therefore, for reasons of cost, such electronic systems can rarely afford to have their control device replaced with a control device having a secure non-volatile internal memory that could be used to securely store a cryptographic key. For example, replacing the existing control device would result in complete revision of the hardware and the software of the electronic system and would therefore be very time consuming and cost intensive. In addition, the data integrity of flash memories has a time limit, e.g. 15 years, and flash memories have only a limited number of write cycles, for example up to 1 million write cycles.

Instead of developing a complete revision of the hardware and software for an electronic system, there are other ways to protect the communication between the control device and the security module. To this end, by way of example, the key for encrypted communication between the control device and the security module can be stored in the computer program product, e.g. the firmware, that controls the communication with the security module on the control device. However, suitable analysis tools can be used to read a cryptographic key from a piece of firmware.

In order to prevent such reading of the cryptographic key, the firmware can be protected against what is known as reverse engineering. To this end, a person skilled in the art is aware of what are known as obfuscation techniques. Such obfuscation techniques are limited in terms of the security level that can be achieved thereby and in terms of the execution speed, however. In addition, the use of obfuscation techniques increases the size of the firmware and hence the memory requirement for storing and executing the firmware by a multiple factor (e.g., factors of 30 and more).

SUMMARY OF THE INVENTION

It is therefore an objective of the present invention to provide a simple way of protecting the communication between a control device and a security module.

The invention achieves this objective through systems and methods for securely transmitting data having the features as provided in the enclosed claims.

In one embodiment, a system for securely transmitting data having a control device and at least one security module produces a cryptographic key. The control device is configured for using a physically unclonable function (PUF). The security module(s) are configured for communicating with the control device confidentially and/or authentically on the basis of the cryptographic key produced. Notably, the control device does not have an access-protected non-volatile memory for storing the cryptographic key.

In another embodiment, a method for securely transmitting data comprises a step of producing, at a control device, a cryptographic key using a physically unclonable function (PUF). The method also includes a step of transmitting the data between the control device and a security module using the cryptographic key.

The inventor of the present invention has recognized that a control device usually has hardware features that allow a cryptographic key to be derived from these hardware features during the ongoing operation of such a control device.

The present invention builds on the recognition by providing a control device that can use a physically unclonable function, also referred to as PUF, to derive a cryptographic key from hardware features of the control device itself. Subsequently, this derived cryptographic key can be used to encrypt and/or authenticate the communication between the control device and a security module. In this way, the control device does not need to permanently store the cryptographic key once produced, since the control device can derive the cryptographic key afresh each time the system is started, for example.

Physically unclonable functions (PUFs) can be used to derive a robust and explicit fingerprint for a given piece of hardware from minor differences in the technical form of the hardware, particularly of individual integrated circuits. These small differences normally arise automatically in the fabrication of semiconductors as a result of inevitable production tolerances. If required, however, such small hardware differences can also be produced consciously during the production of a semiconductor. In a control device according to the invention, these minor hardware differences are measured and converted into digital data, from which the control device then derives a cryptographic key.

The present invention thus allows a cryptographic key to be provided in a control device but does not require the cryptographic key to be stored in a non-volatile memory. The cryptographic key is then taken as a basis for performing encrypted and/or authentic communication. This not only reduces or avoids the requirement for use of non-volatile memory (e.g., flash memory), but it also prevents a cryptographic key stored in such memory from being read by an attacker through hardware manipulations.

The use of a physically unclonable function (PUF) also has the advantage that, in the event of an attempt by an attacker to manipulate the hardware, the hardware properties are changed such that reconstruction of the cryptographic key is no longer possible.

In the present invention, communication is understood to involve two aspects of cryptography. Firstly, cryptographically protected communication can mean the protection of the confidentiality of data, that is to say conventional encryption. Secondly, it also means the protection of the integrity of data, e.g. using an electronic signature or what is known as a "message authentication code".

In particular, the present invention can be used advantageously in embedded systems, e.g. controllers for industrial installations, since there is an increased need for security in the latter on account of ever more significantly increasing threats from attackers.

Advantageous embodiments and developments of the systems and methods according to the invention arise from the claims and from the description with reference to the figures.

In one embodiment, the control device has at least one hardware device, which is configured for providing a specific feature combination, and a calculation unit, which is configured for taking the provided specific feature combination as a basis for producing the cryptographic key using the physically unclonable function, PUF. If a hardware device that provides a specific feature combination is provided, secure and repeatable production of the cryptographic key becomes possible.

In one embodiment, the security module has an access-protected non-volatile memory and a computation device, which is configured for receiving the cryptographic key produced from the control device and to store it in the non-volatile memory. This allows effective encryption and/or authentication of the communication between the control device and the security module without the need for the control device to transmit the cryptographic key to the security module afresh after each time the system is started.

In one embodiment, the control device and the security module each has a communication interface and are configured for using the communication interfaces to exchange data, wherein the control device is configured for initially providing the security module with the cryptographic key via the communication interfaces in an unencrypted data transmission and, following the data transmission of the cryptographic key, to communicate with the security module in encrypted form and/or authentically (or in authenticated form) on the basis of the transmitted cryptographic key. The security module is configured for using the communication interfaces to communicate initially with the control device in unencrypted form and, following the receipt of the cryptographic key, to communicate with the control device in encrypted form and/or authentically (or in authenticated form) on the basis of the received cryptographic key. This ensures that the control device exchanges just as much data as necessary with the security module using unprotected communication. If the security module has received the cryptographic key from the control device, the communication thereafter takes place only in encrypted form and/or authentically (or in authenticated form).

In one embodiment, the security module is configured for receiving the cryptographic key from the control device only once and to store the received cryptographic key in the access-protected non-volatile memory, wherein the access-protected non-volatile memory is in write-once-only form and wherein the control device is configured for providing the cryptographic key for the security module only once.

The transmission of the cryptographic key from the control device to the security module can take place in a suitable protected environment in a particular production step during the manufacture of the system, for example. In this case, the control device sends the security module the cryptographic key, e.g. in plain text, via the communication interface. The security module then stores the received cryptographic key in its non-volatile memory. At the same time, the security module locks itself against the transmission of new cryptographic keys.

Similarly or alternatively, the control device can lock itself against fresh transmission of the cryptographic key. That is to say that the coupling of the control device to the security module can be performed precisely a single time. Each time the system is started, the control device then derives the cryptographic key using the physically unclonable function (PUF), and the security module uses the cryptographic key stored in the non-volatile memory. Unprotected communication between the control device and the security module no longer takes place after this step of coupling. By way of example, in a production installation, a specific piece of firmware that allows the transmission of the cryptographic key can be loaded into the control device. After the cryptographic key has been transmitted, the actual function firmware, which does not allow the transmission of the cryptographic key, can be loaded into the control device in the production installation.

This one-time coupling of the security module to the control device also prevents the misuse of the security module by a potential attacker on the system. By way of example, it is not possible for the attacker to remove, e.g. unsolder, a coupled security module from a system and misuse it.

In further embodiments, the security module is also equipped with suitable hardware protection mechanisms that prevent the key from being read from the non-volatile memory of the security module.

In one embodiment, the control device has a program-controlled device. In addition, a calculation unit may be arranged in the program-controlled device, wherein the program-controlled device is configured for executing a first computer program product, which is configured for performing the encrypted and/or authentic communication with the security module via the communication interfaces. In this case, the program-controlled device may be configured for executing further computer program products, wherein the program-controlled device is configured for denying the further computer program products access to a memory that is used by the first computer program product for storing the cryptographic key. This prevents an attacker from being able to load malware, for example, into the control device, which malware reads the cryptographic key directly from the respective memory area of the memory of the control device and communicates it to the attacker, e.g. via a further interface of the control device.

In one embodiment, the control device denies the further computer program products access to the memory that is used by the first computer program product by virtue of the control device using memory protection mechanisms of what is known as a "memory management unit". In a further embodiment, the control device also prevents what are known debugging tools, such as JTAG systems, from accessing the memory that is used for the first computer program product.

In one embodiment, the communication interfaces are in the form of serial peripheral interface (SPI) interfaces and/or in the form of inter integrated circuit (I²C) interfaces and/or in the form digital parallel interfaces and/or in the form of digital serial interfaces and/or in the form of a wireless interface and/or in the form of an optical interface. This allows flexible customization of the system to different requirements and areas of use.

In one embodiment, the computation device and/or the program-controlled device is/are in the form of a microcontroller and/or an application-specific integrated circuit (ASIC) and/or a programmable logic chip and/or a computer and/or an embedded computer. This likewise allows flexible customization of the system to different requirements and areas of use.

In one embodiment, the hardware device is in the form of an internal RAM memory of the control device and/or in the form of one or more delay loops and/or in the form of one or more ring-oscillators and/or in the form of two or more flipflops between which there is a cross-coupling and/or in the form of a line matrix in which the material in the line interspaces is randomly doped with dielectric particles and/or particles having non-reactive resistances. This allows the hardware device to be selected and customized to the respective intended use in accordance with the respective application and the requirements of the use environment. In this case, in one embodiment, the hardwire device is integrated in a housing with the control device or, as part of the control device, with the latter in a housing.

In one embodiment, the specific feature combination of the hardware device has transit times for individual gates of the hardware device and/or a turn-on behavior for individual components, particularly a turn-on pattern for an internal RAM memory, of the hardware device, particularly also for a processor cache of the control device, and/or resistive properties of the hardware device and/or capacitive properties of the hardware device and/or inductive properties of the hardware device and/or frequencies of oscillators. This likewise allows the hardware device to be selected and customized to the respective intended use in accordance with the respective application and the requirements of the use environment.

In one embodiment, the specific feature combination has the turn-on pattern of a RAM memory that is not automatically erased when the system is started. In such an embodiment, the control device produces the cryptographic key directly after the system has been turned on.

The above embodiments and developments can be combined with one another as desired, provided that it is appropriate. Further possible embodiments, developments and implementations of the invention also comprise combinations of features of the invention that are described above or below for the exemplary embodiments, which combinations are not explicitly cited. In particular, a person skilled in the art would also add individual aspects to the respective basic form of the present invention as improvements or additions.

BRIEF DESCRIPTION OF THE DRAWINGS

The present invention is explained in more detail below with reference to the exemplary embodiments that are indicated in the schematic figures of the drawings, in which.

In the figures, elements and apparatuses that are the same or have the same function have been provided—unless stated otherwise—with the same reference symbols/numerals.

DETAILED DESCRIPTION OF THE PREFERRED EMBODIMENTS

Figure 1:
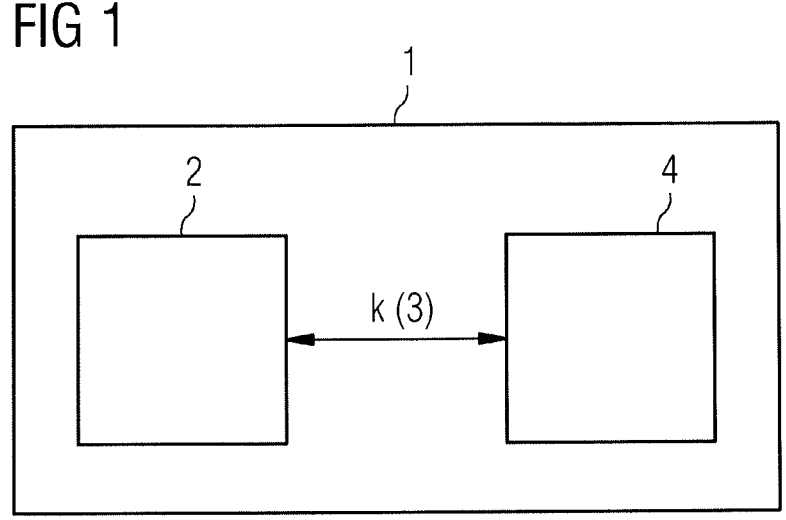
FIG. 1 shows a block diagram of an embodiment of a system according to the invention.

FIG. 1 shows a block diagram of an embodiment of a system 1 according to the invention. The system 1 in FIG. 1 has a control device 2 that is configured to produce a cryptographic key 3 using a physically unclonable function (PUF). The control device 2 is also coupled to a security module 4. The communication between the control device 2 and the security module 4 takes place in encrypted form and/or authentically (or in authenticated form). In this case, the encryption and/or authentication of the communication between the control device 2 and the security module 4 is based on the cryptographic key 3 produced by the control device 2. This is shown in FIG. 1 by the connection between the control device 2 and the security module 4 being used to perform communication k on the basis of the cryptographic key 3, that is to say k(3).

Figure 2:
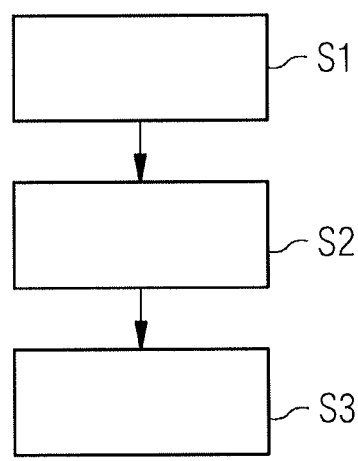
FIG. 2 shows a flowchart for an embodiment of a method according to the invention.

FIG. 2 shows a flowchart for an embodiment of a method according to the invention. In a first step S1, a system 1 according to the invention is provided. In a second step S2, a cryptographic key 3 is produced using a physically unclonable function (PUF) in a control device 2. Finally, in a third step S3, communication takes place in encrypted form and/or authentically (or in authenticated form) between the control device 2 and a security module 4, on the basis of the cryptographic key 3 produced.

Figure 3:
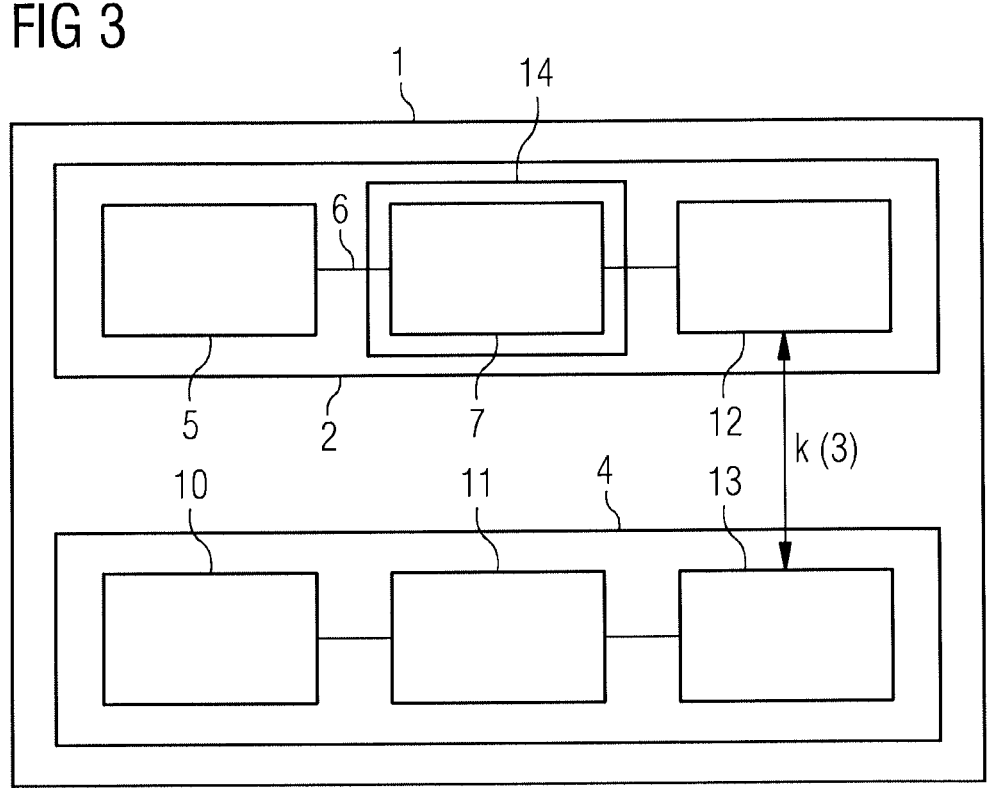
FIG. 3 shows a block diagram of a further embodiment of a system according to the invention.

FIG. 3 shows a block diagram of a further embodiment of a system 1 according to the invention. The system 1 in FIG. 3 differs from the system 1 in FIG. 1 in that the control device 2 has a hardware device 5 that provides a specific feature combination 6 for a calculation unit 7 of a program-controlled device 14. The calculation unit 7 takes the specific feature combination 6 and a physically unclonable function (PUF) as a basis for producing the cryptographic key 3. The control device 2 uses a communication interface 12 to communicate with the security module 4 on the basis of the cryptographic key 3.

The security module 4 has a non-volatile memory 10 that the security module 4 uses to store the cryptographic key 3. In addition, the security module 4 has a computation device 11 that uses a communication interface 13 to communicate with the control device 2 and to receive the cryptographic key 3 from the control device 2. The computation device 11 is also configured to store the cryptographic key 3 in the non-volatile memory 10.

The program-controlled device 14 of the control device 2 is in the form of a microcontroller 14. In this case, the calculation unit 7 is in the form of a computer program product 7 that is executed in addition to further computer program products in the microcontroller 14. In order to prevent the further computer program products from accessing the memory of the microcontroller 14 that stores the cryptographic key 3, the microcontroller 14 has what is known as a memory management unit. This memory management unit assigns a dedicated memory area to each computer program product and prevents a computer program product from accessing a memory area that is outside the memory area assigned to the respective computer program product.

The hardware device 5 for the control device 2 is in the form of a processor cache 5 of the program-controlled device 14. The processor cache 5 forms, at the moment of turn-on, a characteristic turn-on pattern from which the cryptographic key is produced using the physically unclonable function (PUF). In further embodiments, the hardware device 5 may be in the form of a specifically produced hardware device 5, what is known as a unique/unclonable object.

In one embodiment of the security module 4, the non-volatile memory 10 is in the form of a flash memory 10, and in further embodiments the non-volatile memory 10 may be in the form of an EEPROM memory 10, in the form of an OTP NVM (one time programmable nonvolatile memory) 10 or the like. In addition, the computation device 11 is in the form of a microcontroller 11. In further embodiments, the computation device 11 may be in the form of a security controller 11, in the form of an ASIC 11, in the form of a filed-programmable gate array (FPGA) 11 or the like.

In one embodiment, the security module 4 is in the form of a security IC that is integrated with the control device 2 in an electronic system. Such a security module can be used, by way of example, in controllers for industrial installations, e.g. programmable logic controllers (PLCs). In a further embodiment, the security module 4 may be in the form of a smartcard. Such a security module 4 can be used particularly in pay TV applications, in person identification installations or the like.

In the embodiment shown in FIG. 3, the communication interfaces 12, 13 are in the form of SPI interfaces 12, 13. In further embodiments, the communication interfaces 12, 13 may be, by way of example, in the form of I²C interfaces 12, 13, in the form of USB interfaces 12, 13, in the form of serial interfaces 12, 13, in the form of parallel interfaces, 12, 13, in the form of optical interfaces 12, 13, e.g. fiber optic interfaces 12, 13, in the form of wireless communication interfaces 12, 13 or the like.

In the embodiment shown in FIG. 3, the security module 4 is coupled to the control device 2 in a production step during the production of an electrical system. In this case, the control device 2 transmits the cryptographic key 3 to the security module 4. The latter then locks itself against fresh transmission of the cryptographic key 3.

Although the present invention has been described above with reference to preferred exemplary embodiments, it is not limited thereto but rather can be modified in a wide variety of ways. In particular, the invention can be altered or modified in multifarious ways without departing from the essence of the invention.

What is claimed is:

1. A system for securely transmitting data, comprising:
a control device configured to produce a cryptographic key based on a physically unclonable function (PUF), the control device comprising:
at least one hardware device configured to provide a specific feature combination including frequencies of oscillators of the hardware device and at least one of capacitive properties of the hardware device and inductive properties of the hardware device, and
a calculation unit configured to produce the cryptographic key using (A) the specific feature combination including the frequencies of oscillators of the hardware device and at least one of (i) capacitive properties of the hardware device and (ii) inductive properties of the hardware device, and (B) the physically unclonable function (PUF); and
at least one security module configured to communicate the transmitted data to and from the control device at least one of confidentially and authentically using the produced cryptographic key,
wherein the control device has no storage for storing the cryptographic key.

2. The system of claim 1,
wherein the control device further comprises a program-controlled device configured to execute a first computer program product,
wherein the calculation unit is arranged in the program-controlled device,
wherein the first computer program product is configured to perform at least one of the encrypted and authentic communication with the at least one security module via first and second communication interfaces,
wherein the program-controlled device is further configured to execute at least one further computer program product, and
wherein the program-controlled device is further configured to deny the at least one further computer program product access to a memory that is used by the first computer program product for storing the cryptographic key.

3. The system of claim 2, wherein the at least one security module comprises a computation device, wherein at least one of the computation device and the program-controlled device comprises one of a microcontroller, an application specific integrated circuit (ASIC), a programmable logic chip, a computer and an embedded computer.

4. The system of claim 2, wherein at least one of the first and second communication interfaces comprises one of SPI interfaces, I2C interfaces, digital parallel interfaces, digital serial interfaces, a wireless interface and an optical interface.

5. The system of claim 1, wherein the at least one hardware device comprises one of (i) an internal RAM memory of the control device, (ii) at least one delay loop, (iii) at least one ring oscillator, (iv) a plurality of flip-flops including a cross coupling between each flip-flop of said plurality of flip-flops and (v) a line matrix in which a material in the line interspaces is randomly doped with at least one of dielectric particles and particles having non-reactive resistances.

6. The system of claim 1, wherein the specific feature combination of the hardware device further includes at least one of transit times for individual gates of the hardware device, resistive properties of the hardware device, and a turn on behavior for individual components, including a turn on pattern for an internal RAM memory of the hardware device and a processor cache of the control device.

7. The system of claim 1, wherein the at least one security module comprises an access protected non-volatile memory and a computation device, and wherein the computation device is configured to receive the cryptographic key produced at the control device and for storing the cryptographic key in the non-volatile memory.

8. The system of claim 7, wherein the at least one security module is configured to receive the cryptographic key from the control device only once and configured to store the received cryptographic key in the access protected non-volatile memory, wherein the access protected non-volatile memory comprises a write once memory, and wherein the control device is configured to provide the cryptographic key for the security module only once.

9. The system of claim 1,
wherein the control device includes a first communication interface and the at least one security module includes a second communication interface,
wherein the control device and the at least one security module are configured to utilize the first and second communication interfaces to exchange data,
wherein the control device is configured to provide the at least one security module with the cryptographic key via the first and second communication interfaces in an unencrypted data transmission and, following the data transmission of the cryptographic key, such that communication with the security module in at least one of encrypted form and authenticated form occurs using the transmitted cryptographic key, and
wherein the at least one security module is configured to initially communicate with the control device in unencrypted form using the first and second communication interfaces and, following the receipt of the cryptographic key, such that communication with the control device in at least one of encrypted form and authenticated form occurs using the received cryptographic key.

10. A method for securely transmitting data, comprising:
providing a system having a control device which includes no storage for storing a cryptographic key and which includes at least one security module;
producing, at the control device, the cryptographic key based on a physically unclonable function (PUF); and
transmitting the data from the control device to the at least one security module and from the at least one security module to the control device at least one of confidentially and authentically based on the produced cryptographic key;
wherein the control device comprises at least one hardware device configured to provide a specific feature combination including frequencies of oscillators of the hardware device and at least one of capacitive properties of the hardware device and inductive properties of the hardware device, and a calculation unit configured to produce the cryptographic key using (A) the specific feature combination including the frequencies of oscillators of the hardware device and at least one of (i) the capacitive properties of the hardware device and (ii) the inductive properties of the hardware device, and (B) the physically unclonable function (PUF).

11. The method of claim 10, wherein the producing step comprises:
providing a specific feature combination for a hardware device; and
producing the cryptographic key using the provided specific feature combination and the physically unclonable function (PUF).

12. The method of claim 10,
wherein the control device uses a first communication interface and the at least one security module uses a second communication interface to exchange data, and
wherein the transmitting step comprises:
transmitting, from the control device, the cryptographic key to the at least one security module via the first and second communication interfaces in an unencrypted data transmission; and
sending data to the control device from the at least one security module in at least one of encrypted form and authenticated form using the transmitted cryptographic key following the transmission of the cryptographic key,
wherein the at least one security module initially communicates with the control device in unencrypted form.

13. The method of claim 10, further comprising:
receiving, at the at least one security module, the cryptographic key from the control device only once; and
storing the cryptographic key in an access-protected non-volatile memory of the at least one security module.

14. The method of claim 10, further comprising:
executing, at the control device, a first computer program product that performs the encrypted transmission with the at least one security module via at least one communication interface, and
executing, at the control device, at least one further computer program product,
wherein the control device denies the at least one further computer program product access to a memory that is used by the first computer program product to store the cryptographic key.

15. A system for securely transmitting data, comprising:
a control device configured to produce a cryptographic key based on a physically unclonable function (PUF), the control device comprising:
at least one hardware device configured to provide a specific feature combination including frequencies of oscillators of the hardware device and at least one of (i) capacitive properties of the hardware device, (ii) inductive properties of the hardware device (iii) and a turn on behavior for individual components, including a turn on pattern for an internal RAM memory of the hardware device, and a calculation unit configured to produce the cryptographic key using (A) the specific feature combination including the frequencies of oscillators of the hardware device and at least one of (i) the capacitive properties of the hardware device, (ii) the inductive properties of the hardware device and (iii) the turn on behavior for individual components, including the turn on pattern for the internal RAM memory of the hardware device, and (B) the physically unclonable function (PUF); and
at least one security module configured to communicate the transmitted data to and from the control device at least one of confidentially and authentically using the produced cryptographic key,
wherein the control device has no storage for storing the cryptographic key.

* * * * *